US005105351A

United States Patent [19]

Harada et al.

[11] Patent Number: 5,105,351

[45] Date of Patent: Apr. 14, 1992

[54] X-RAY POWER SUPPLY WITH PLURAL FREQUENCY CONVERTERS

[75] Inventors: Toyoshige Harada, Tochigi; Kenichi Tanbo, Ootawara, both of Japan

[73] Assignee: Kabushiki Kaisha Toshiba, Kawasaki, Japan

[21] Appl. No.: 545,829

[22] Filed: Jun. 28, 1990

[30] Foreign Application Priority Data

Jun. 30, 1989 [JP] Japan ................................ 1-169645

[51] Int. Cl.[5] ............................................ H02M 5/00

[52] U.S. Cl. ...................................... 363/65; 363/37; 378/101

[58] Field of Search ......................... 378/91, 101, 104; 363/37, 65, 67, 68, 71, 126; 323/361, 359

[56] References Cited

U.S. PATENT DOCUMENTS

| | | | |
|---|---|---|---|
| 3,747,037 | 7/1973 | Earing | 336/96 |
| 3,792,338 | 2/1974 | Barthelemy | 321/8 |
| 4,317,039 | 2/1982 | Romandi | 378/105 |
| 4,338,657 | 7/1982 | Lisini et al. | 363/68 |
| 4,533,987 | 8/1985 | Tomofuji | 363/36 |
| 4,545,005 | 10/1985 | Mudde | 363/68 |
| 4,807,105 | 2/1989 | Varjasi et al. | 363/68 |

FOREIGN PATENT DOCUMENTS

| | | |
|---|---|---|
| 0108336 | 10/1983 | European Pat. Off. . |
| 0286678 | 12/1986 | European Pat. Off. . |
| 0315336 | 10/1988 | European Pat. Off. . |
| 2422313 | 4/1979 | France . |
| 2431237 | 7/1979 | France . |
| 0240858 | 10/1986 | Japan . |
| 2100480 | 6/1982 | United Kingdom . |

*Primary Examiner*—Jeffrey Sterrett

*Attorney, Agent, or Firm*—Finnegan, Henderson, Farabow, Garrett and Dunner

[57] ABSTRACT

An output voltage of an A.C. power source is input to an frequency converter and the frequency thereof is increased. A plurality of high voltage transformers of small capacity each of which has a secondary winding of a small number of turns and which are connectetd in parallel with one another are connected to an output terminal of the frequency converter. Outputs of the high voltage transformers are respectively connected to high voltage rectifier circuits. Outputs of the high voltage rectifier circuits are serialy coupled, the output voltages thereof are added together, and the addition result is applied to an X-ray tube. Combinations of the high voltage transformers and the high voltage rectifier circuits are molded into units one or a preset number at a time with solid insulating material including gel insulating material.

4 Claims, 5 Drawing Sheets

X-RAY POWER SUPPLY WITH PLURAL FREQUENCY CONVERTERS

BACKGROUND OF THE INVENTION

1. Field of the Invention

The present invention relates to an X-ray generator apparatus having an X-ray tube which generates X-rays when applied with a high voltage obtained by increasing an input A.C. voltage by means of a step-up transformer or the like and rectifying the increased voltage.

2. Description of the Related Art

An example of this type of conventional X-ray generator apparatus is shown in FIG. 1. In order to enhance the performance and make the device small and lightweight, a frequency converter 2 for converting the frequency of a voltage supplied from an input power source (A.C. power source) is connected to the primary side of a high voltage transformer 3. An output voltage of the frequency converter 2 is increased by the high voltage transformer 3 and an output voltage of the high voltage transformer 3 is rectified by a high voltage rectifier 4. A rectified output of the high voltage rectifier 4 is applied between the anode and cathode of an X-ray tube 5 serving as an X-ray source.

The frequency converter 2 is generally formed of a rectifier for converting an input A.C. voltage to a D.C. voltage, a capacitor for filtering the D.C. voltage, and an inverter for converting the D.C. voltage from the capacitor to an A.C. voltage of a desired frequency. The frequency converter 2 converts the frequency fo (which is a commercial frequency and is generally 50/60 Hz) of the input A.C. voltage to a frequency f1 which is higher than the frequency fo and then applies the voltage to the high voltage transformer 3. As the output frequency f1 of the frequency converter 2 is set to be higher, the size and weight of the frequency converter 2 and high voltage transformer 3 can be reduced. Since the impedances of coils and capacitors generally vary according to the frequency, the capacitance and inductance can be reduced as the frequency is set higher if the impedances are kept unchanged. Since the capacitance and inductance vary in proportion to the size of the capacitor and coil, the size and weight of the frequency converter 2 and high voltage transformer 3 using the coil and capacitor can be reduced as the frequency becomes higher.

However, in the above X-ray generator apparatus, the output frequency f1 of the frequency converter 2 cannot be increased limitlessly and the upper limit thereof is determined by the characteristic of the high voltage transformer 3 for the following reason. FIG. 2 shows an equivalent circuit of the device shown in FIG. 1 in view of the secondary portion of the transformer 3. In FIG. 2, L1, L2 and M respectively denote the primary inductance, secondary inductance and mutual inductance of the high voltage transformer 3. N denotes the turn ratio (the number of turns of the secondary windings/the number of turns of the primary windings) of the transformer 3. In this case, in order to obtain a high output voltage, the high voltage transformer 3 is so designed that the number of turns of the secondary winding is set to be very larger than that of the primary winding, and thus the secondary inductance L2 is very larger than the primary inductance L1 and mutual inductance M. Therefore, the inductance of the secondary portion of the high voltage transformer 3 which is actually equal to (L2−M) as shown in FIG. 2 can be regarded as being equal to the secondary inductance L2 by neglecting M, and in the following explanation, it is assumed that the inductance of the secondary portion is equal to L2. Further, assuming that the equivalent impedance of a the X-ray tube 5 is Rx and the terminal voltage of the X-ray tube 5 is Ex and the rectifier 4 is omitted from being consideration since it does not relate to the terminal voltage Ex, then the secondary inductance L2 is serially connected to the impedance Rx. If the output frequency of the frequency converter 2 is f1, an impedance Z2 due to the secondary impedance L2 can be expressed by the following equation and it is understood that it varies in proportion to the output frequency f1 of the frequency converter 2:

$$Z2 = 2\pi \cdot f1 \cdot L2 \quad (1)$$

Further, the voltage Ex applied to the X-ray rube 5 is expressed as follows:

$$Ex = E2 \cdot Rx/(Rx + Z2) \quad (2)$$

Since the turn ratio N is very large and thus the inductance $(L1-M)/N^2$ can be neglected, a terminal voltage E2 of the mutual inductance M is expressed as follows using an output voltage E1 of the frequency converter 2:

$$E2 = E1 \cdot N \quad (3)$$

As is clearly understood from the equations (1) and (2), the impedance Z2 becomes higher as the output frequency f1 of the frequency converter 2 becomes higher, causing a problem that the voltage Ex applied to the X-ray tube 5 is lowered. For this reason, the output frequency f1 of the conventional frequency converter 2 has an upper limit of approximately 10 KHz and a higher frequency exceeding the upper limit cannot be attained. If the frequency is set to approximately 10 KHz, it is difficult to greatly reduce the size and weight of the transformer and rectifier circuit and noise may be generated from the transformer 3. The reason why the output frequency f1 of the frequency converter 2 can be increased only to approximately 10 KHz at most is that the secondary inductance L2 of the high voltage transformer 3 is very large.

In order to solve the above problem, it has been proposed to modify the primary portion of the high voltage transformer 3 as shown in FIGS. 3 and 4. In the circuit of FIG. 3, a capacitor Cl is serially connected to the primary winding of the high voltage transformer 3 to attain a series resonance operation on the primary portion. In the circuit of FIG. 4, a capacitor C2 is connected in parallel with the primary winding of the high voltage transformer 3 to attain a parallel resonance operation on the primary portion. However, in either circuit, a voltage on the primary portion of the high voltage transformer 3 is equivalently increased by the series resonance or parallel resonance operation. The inductance L1 of the primary portion is originally small and the resonance voltage is low, and therefore, in order to obtain the same voltage applied to X-ray tube 5 as that obtained in a case wherein no resonance circuit is connected, it is only possible to increase the output frequency of the frequency converter 2 to two or three times the output frequency set in a case wherein no resonance circuit is connected.

Further, in U.S. Pat. No. 4,545,005 (Mudde), the secondary winding of the high voltage transformer is divided into a plurality of sub-windings to increase the frequency of the high voltage transformer, the sub-windings are connected to rectifier circuits are serially coupled and applied to an X-ray tube. However, the high voltage transformer is not divided and the high voltage transformer can be regarded as being a single transformer, and an output of one frequency converter is simply connected to a single high voltage transformer. Therefore, like the conventional case shown in FIG. 1, it is only possible to increase the frequency to approximately 10 KHz at most.

Further, in U.S. Pat. No. 4,317,039 (Romandi), plural frequency converters and plural high voltage transformers are used, but in this conventional case, the object thereof is to reduce ripples and the object is attained by setting the phases of the plural frequency converters different from one another. Therefore, this reference does not aim to increase the frequency of the transformer and discloses that the frequency lies in the medium frequency range and amounts to approximately six to seven KHz.

SUMMARY OF THE INVENTION

An object of the present invention is to provide an X-ray generator apparatus in which the frequency of a voltage from an A.C. power source is increased by a frequency converter, then the voltage is increased by means of a transformer, and the increased voltage is rectified by means of a rectifier and applied to an X-ray tube, and in which the output frequency of the frequency converter is increased and the size and weight of the transformer and rectifier are reduced.

An X-ray generator apparatus according to the present invention comprises frequency converter means connected to an A.C. power source, for increasing the frequency of an A.C. voltage; plural transformer means connected to an output of the frequency converter means, for increasing the output A.C. voltage from the frequency converter means; and rectifier means for converting the output A.C. voltages from the plural transformer means to D.C. voltages, serially adding all of the D.C. voltages, and applying the result of addition of the D.C. voltages to an X-ray tube.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 5:
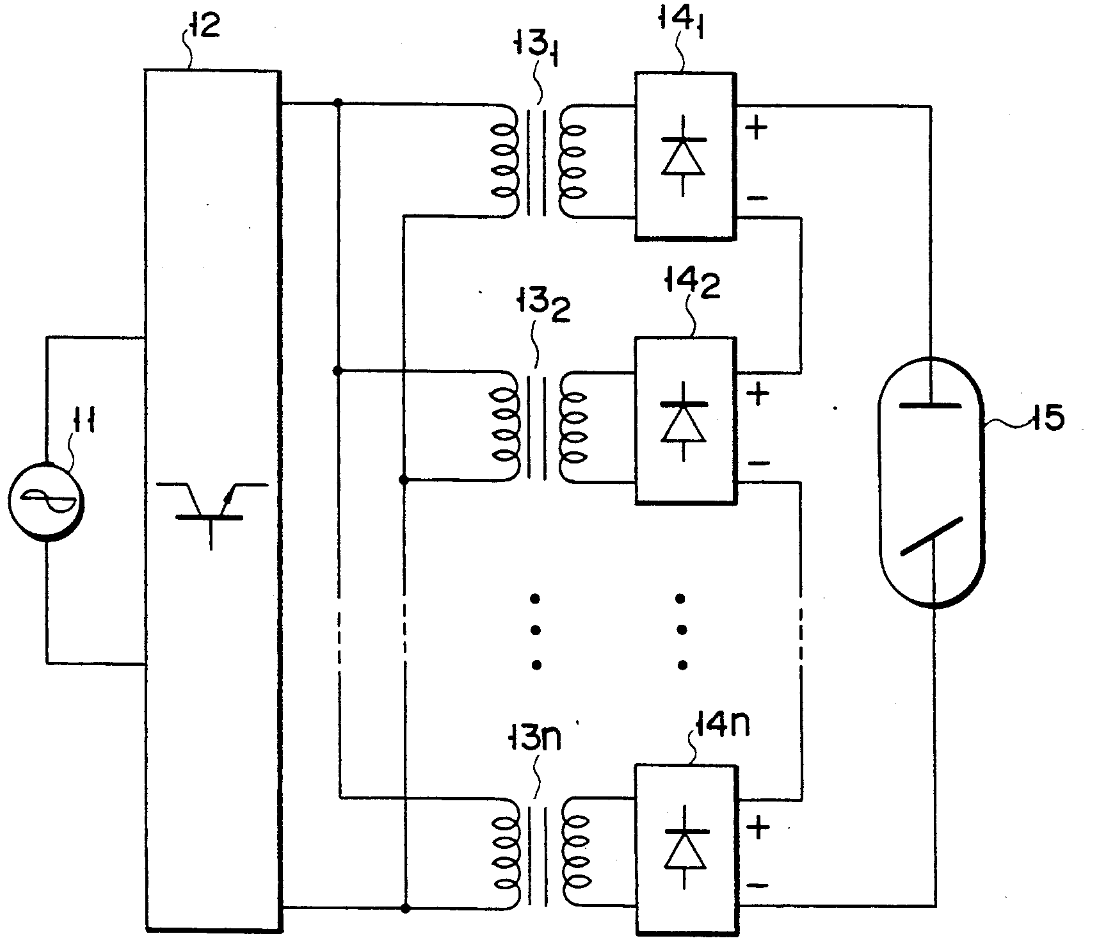
FIG. 5 is a block diagram of a first embodiment of an X-ray generator apparatus according to the present invention.

There will now be described an embodiment of an X-ray generator apparatus according to the present invention with reference to the accompanying drawings FIG. 5 is a block diagram showing the construction of a first embodiment An A.C. power source 11 serving as an input power source is connected to the input terminal of an frequency converter 12. The frequency converter 12 increases the frequency of an A.C. voltage supplied from the A.C. power source 11. High voltage transformers $\mathbf{13}_1$, $\mathbf{13}_2$, . . . $\mathbf{13}_n$ are connected in parallel with one another between output terminals of the frequency converter 12. That is, one end of the primary winding of each of the high voltage transformers $\mathbf{13}_1$, $\mathbf{13}_2$, . . . $\mathbf{13}_n$ is connected to one of the output terminals of the frequency converter 12 and the other end of the primary winding of each of the high voltage transformers $\mathbf{13}_1$, $\mathbf{13}_2$, . . . $\mathbf{13}_n$ is connected to the other output terminal of the frequency converter 12. The secondary windings of the high voltage transformers $\mathbf{13}_1$, $\mathbf{13}_2$, . . . $\mathbf{13}_n$ are respectively connected to high voltage rectifiers $\mathbf{14}_1$, $\mathbf{14}_2$, . . . $\mathbf{14}_n$. The output terminals of the high voltage rectifiers $\mathbf{14}_1$, $\mathbf{14}_2$, . . . $\mathbf{14}_n$ are serially connected and the result of serial addition obtained by the series connection is applied to an X-ray tube 15. That is, the positive output terminals of the high voltage rectifiers $\mathbf{14}_1$ is connected to the anode of the X-ray tube 15, the negative output terminals of the high voltage rectifiers $\mathbf{14}_1$, $\mathbf{14}_2$, . . . $\mathbf{14}_{n-1}$ are connected to the positive output terminals of the high voltage rectifiers $\mathbf{14}_2$, $\mathbf{14}_3$, . . . $\mathbf{14}_n$, and the negative output terminal of the high voltage rectifier $\mathbf{14}_n$ is connected to the cathode of the X-ray tube 15.

In this case, the number of turns of each of the primary windings of the high voltage transformers $\mathbf{13}_1$, $\mathbf{13}_2$, . . . $\mathbf{13}_n$ is set to be equal to that of the primary winding of the conventional high voltage transformer 3 shown in FIG. 1 and the number of turns of each of the secondary windings of the high voltage transformers $\mathbf{13}_1$, $\mathbf{13}_2$, . . . $\mathbf{13}_n$ is set to $1/n$ of that of the secondary winding of the conventional high voltage transformer 3 in order to simplify the description.

Figure 6A:
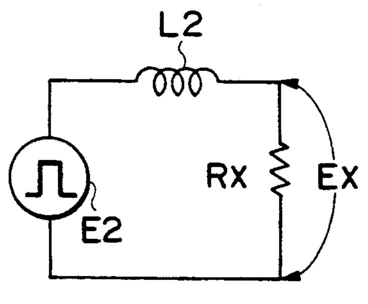
FIGS. 6A and 6B are equivalent circuits of a portion ranging from the secondary winding of a high voltage transformer to the X-ray tube in the conventional device of FIG. 1 and the first embodiment.
Figure 6B:
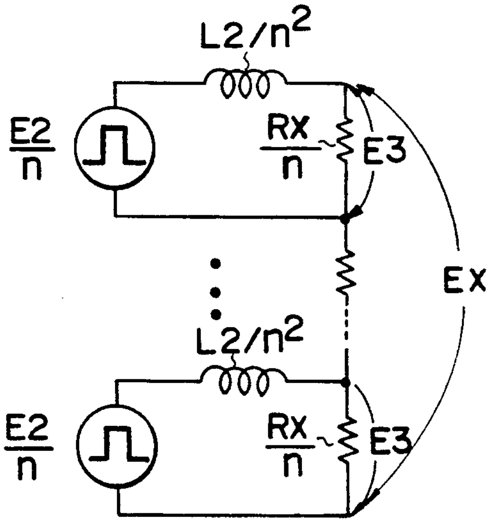

Next, the operation of this embodiment is explained. FIG. 6A is an equivalent circuit diagram of a secondary portion (a portion from the secondary winding to the X-ray tube with the rectifier being neglected) of the conventional transformer 3 of FIG. 1. FIG. 6B is also the equivalent circuit diagram of the secondary portions of the transformers $13_1$, $13_2$, . . . $13_n$ of the first embodiment shown in FIG. 5. In general, the number of turns of the secondary winding of each of the high voltage transformers 3, $13_1$, $13_2$, . . . $13_n$ is extremely larger than that of the primary winding thereof, and the secondary inductance L2 is set to a large value. Therefore, the equivalent circuit diagrams can be expressed only by the secondary inductance L2 as shown in FIGS. 6A and 6B. The frequency converter is generally on/off operated by the switching pulse and outputs a pulse signal. Therefore, the voltage E2 is also expressed by a pulse.

Figure 7:
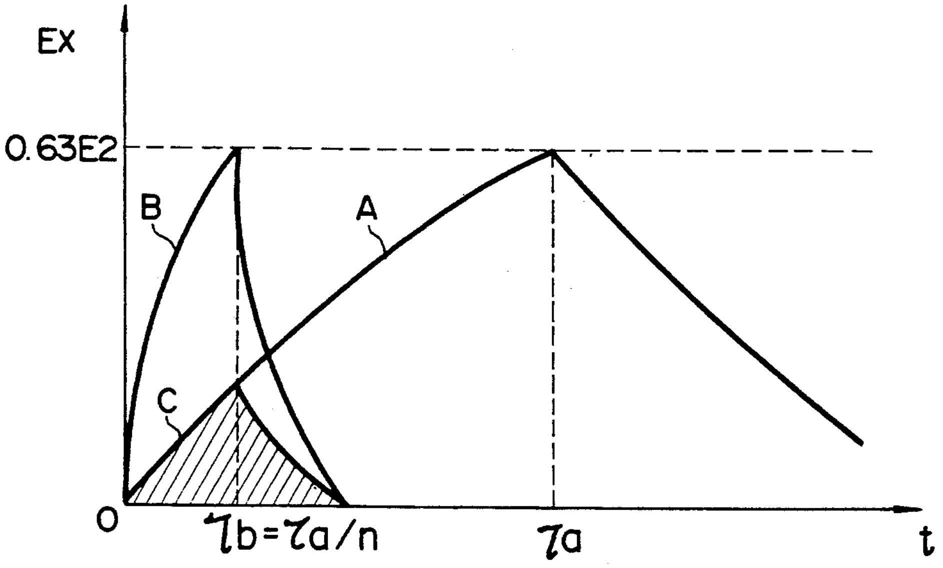
FIG. 7 is a diagram showing the characteristic of the first embodiment.

If, in FIG. 6A, L2 / Rx = $\tau$a, then the voltage Ex applied to the X-ray tube 5 is expressed by using the time constant $\tau$a as follows and rises as shown by a curve A in FIG. 7. The reference time t=0 with respect to time t in FIG. 7 is a timing at which the voltage E2 starts to rise.

$$Ex = E2\,(1 - e^{-t/\tau a}) \quad (4)$$

That is, if it is assumed that the pulse width of the voltage E2 is $\tau$a, the tube voltage Ex is set to a maximum value (0.63 E2) at the time of t=$\tau$a.

Figure 1:
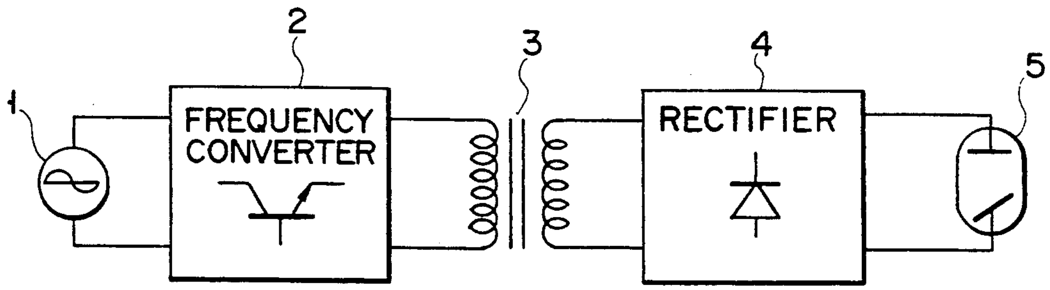
F I G. 1 (PRIOR ART)
FIG. 1 is a block diagram of an example of the conventional X-ray generator apparatus.
Figure 2:
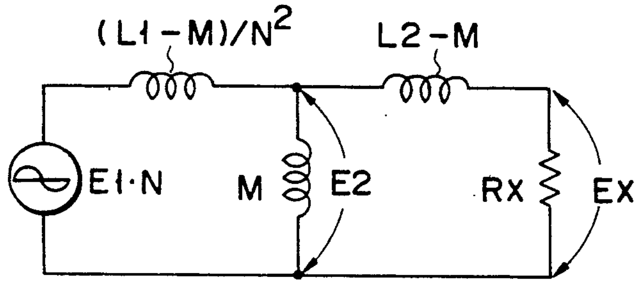
F I G. 2 (PRIOR ART)
FIG. 2 is an equivalent circuit diagram of the device shown in FIG. 1.
Figure 3:
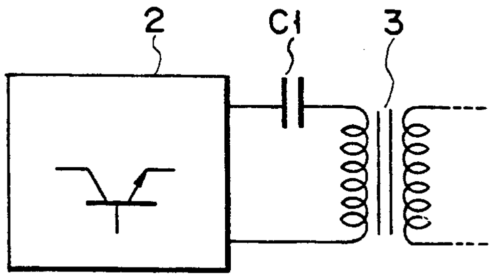
F I G. 3 (PRIOR ART)
FIG. 3 is a diagram showing another example of the conventional device.
Figure 4:
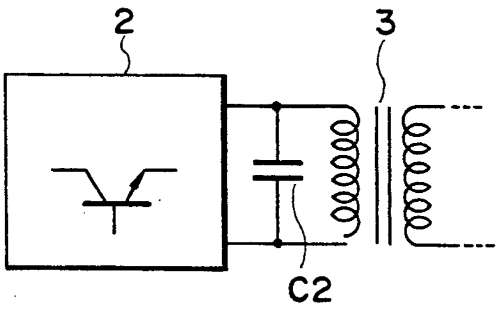
F I G. 4 (PRIOR ART)
FIG. 4 is a diagram showing still another example of the conventional device.

On the other hand, in the device of this embodiment shown in FIG. 5, the number of turns of the secondary winding of each of the high voltage transformers $13_1$, $13_2$, . . . $13_n$ is set to 1/n of that of the high voltage transformer 3 in the conventional device (FIG. 1). Since the inductance of a coil varies in proportion to the square of the number of turns, the secondary inductance becomes $L2/n^2$ and the secondary voltage becomes E2/n in each of the high voltage transformers $13_1$, $13_2$, . . . $13_n$. Further, the load of each of the high voltage transformers $13_1$, $13_2$, . . . $13_n$ is substantially the same as a value obtained by dividing the load Rx in the conventional device by n, that is, it becomes Rx/n. As a result, the equivalent circuit diagram of the embodiment of FIG. 5 can be expressed as shown in FIG. 6A.

In secondary portion of each of the high voltage transformers $13_1$, $13_2$, . . . $13_n$ , the time constant $\tau$b is expressed as follows according to the above description with reference to FIG. 6A:

$$\begin{aligned} \tau b &= (L2/n^2)/(Rx/n) \\ &= (L2/Rx)/n \\ &= \tau a/n \end{aligned} \quad (5)$$

A voltage E3 applied to the load Rx/n is expressed as follows:

$$E3 = E2\,(1 - e^{-t/\tau b}) / n \quad (6)$$

The voltage Ex applied to the X-ray tube 15 is given as follows by serially adding the terminal voltages E3 of the loads:

$$\begin{aligned} Ex &= n \cdot E3 \\ &= E2\,(1 - e^{-t/\tau b}) \end{aligned} \quad (7)$$

That is, as shown by a curve B in FIG. 7, at the time of t=$\tau$b, the tube voltage Ex is set to 0.63 E2 which has been reached at the time of t=$\tau$a in the conventional device. In this case, since $\tau$b=$\tau$a/n as shown by the equation (5), the time constant in the device of this embodiment (FIG. 5) is set to 1/n of that of the conventional device (FIG. 1), and therefore, it is understood that the frequency of the transformers $13_1$, $13_2$, . . . $13_n$ can be increased by n times since the same voltage is obtained if the pulse width of the output of the frequency converter 12 is set to $\tau$b.

The conventional high voltage transformer shown in FIG. 6A, even if the switching pulse width of the frequency converter 2 is simply changed from $\tau$a to 1/n times (=$\tau$b) to increase the frequency, the peak value of the tube voltage Ex expressed by the equation (4) becomes smaller as shown by a curve C in FIG. 7 and the application power simply becomes small as indicated by a hatched portion.

As described above, according to the first embodiment, the high voltage transformer is divided into a plurality (for example, n) of transformers $13_1$, $13_2$, . . . $13_n$ having a small capacity (the number of turns of the primary winding is kept unchanged and the number of turns of the secondary winding is reduced to 1/n times the original value), the primary windings of the divided transformers $13_1$, $13_2$, . . . $13_n$ are connected in parallel with one another between the output terminals of the frequency converter 12 and a voltage obtained by serially adding together the rectification results of the outputs of the respective transformers is applied to the X-ray tube 15. Thus, the secondary inductance of each of the transformers $13_1$, $13_2$, . . . $13_n$ can be reduced to $1/n^2$ times the original value, and as a result, the upper limit of the output frequency of the frequency converter 12 is increased by n times. Therefore, the apparatus including the frequency converter 12 can be made small and lightweight. Since the output frequency of the frequency converter 12 can be increased up to approximately 100 KHz or to a frequency which exceeds the audio frequency, generation of noise which is a problem in the conventional device can be prevented. Further, since the output control of the frequency converter 12 can be effected at a higher speed as the output frequency thereof increases, a high voltage applied to the X-ray tube 15 can be more precisely set by using the feedback operation. Further, since high voltage wave ripples become smaller as the frequency becomes higher, a flat high voltage wave can be obtained. In addition, the rising characteristic of the tube voltage can be improved as shown by the curve B of FIG. 7, it becomes easy to apply a high voltage in a pulse form to the X-ray tube 15 and generate X-rays only at necessary timings, thereby making it possible to reduce the amount of X-ray radiation to an object. It is preferable to form the cores of the high voltage transformers $13_1$, $13_2$, . . . $13_n$ by using ferrite or the like which has a good frequency characteristic in order to attain the high operation frequency. Further, it is also possible to serially connect the outputs of the high voltage transformers $13_1$, $13_2$, . . . $13_n$ instead of connecting the transformers $13_1$, $13_2$, . . . $13_n$ to the respective rectifiers $14_1$, $14_2$, . . . $14_n$ and rectify the serially coupled voltages by means of a single rectifier. In addition, it is possible to connect resonant capacitors in series or in parallel on the primary portion of each of the high voltage transformers $13_1$, $13_2$, . . . $13_n$. The frequency converter can change the output voltage in addition to the output frequency by means of a pulse width modulation (PWM) for changing the pulse width of the switching pulse.

Figure 8:
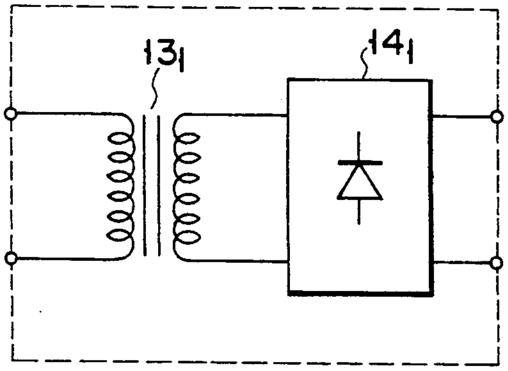
FIG. 8 is a diagram showing a first modification of the first embodiment.
Figure 9:
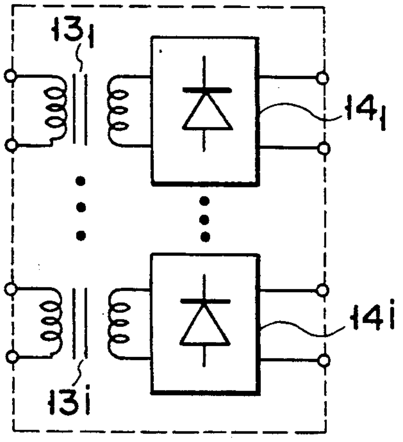
FIG. 9 is a diagram showing a second modification of the first embodiment.
Figure 10:
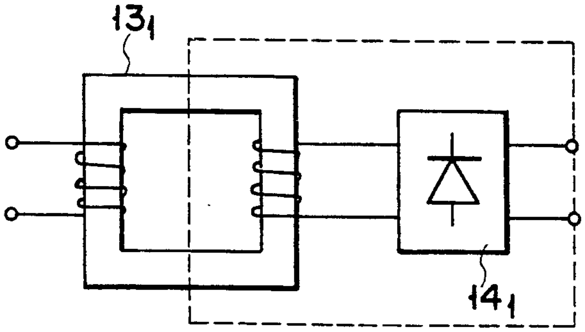
FIG. 10 is a diagram showing a third modification of the first embodiment.

Next, modifications relating to the improvement of the first embodiment are explained. In the conventional X-ray generator apparatus, the high voltage transformer and high voltage rectifier are disposed in a container filled with insulating oil. Since the container is substantially entirely filled with insulating oil, the volume and weight thereof become very large. In this case, the maintenance therefor is troublesome and there occurs a problem that oil leaks out of the container and stains the surrounding. In the first embodiment, since the transformer is divided into a plurality of transformers of small capacities, the high voltage transformer and high voltage rectifier are disposed in a container of small capacity and can be molded into one unit with solid insulation material including gel insulating material. Injection type insulating material such as epoxy and material such as silicone gel which is solidified but has a physical property between those of the fluid and solid can be given as examples of the above insulating material Since silicone gel has a good high frequency characteristic, it can be preferably used as the insulating material for the device constructed to attain a high frequency. Each molding unit may be constructed by a single transformer $13_1$ and a single rectifier $14_1$ as shown in FIG. 8 or by a plurality of transformers $13_1$ to $13_i$ and a plurality of rectifiers $14_1$ and $14_i$ as shown in FIG. 9. Further, as shown in FIG. 10, only the secondary winding of the transformer $13_1$ and the rectifier $14_1$ are molded and it is not always necessary to mold the primary winding of the transformer. Although not shown in the drawing, the high voltage transformer and the rectifier may be separately molded and they are connected by connectors or cables. Thus, various combinations of the molds can be selectively made.

Unlike the conventional device in which a large-high voltage transformer and rectifier are disposed in one container, use of the above molded units makes it unnecessary to fill insulating oil into an unnecessary space, so that a small and lightweight X-ray generator apparatus can be realized which can be easily assembled by combining the units and in which replacement can be effected for each molded unit to attain easy maintenance. Further, since the dielectric breakdown voltage of solid insulating material is higher than that of insulating oil, a high insulation efficiency can be attained and the size and weight can be easily reduced. The small and lightweight X-ray generator apparatus requires only a small installation space in a hospital or the like and can be easily transported.

Figure 11:
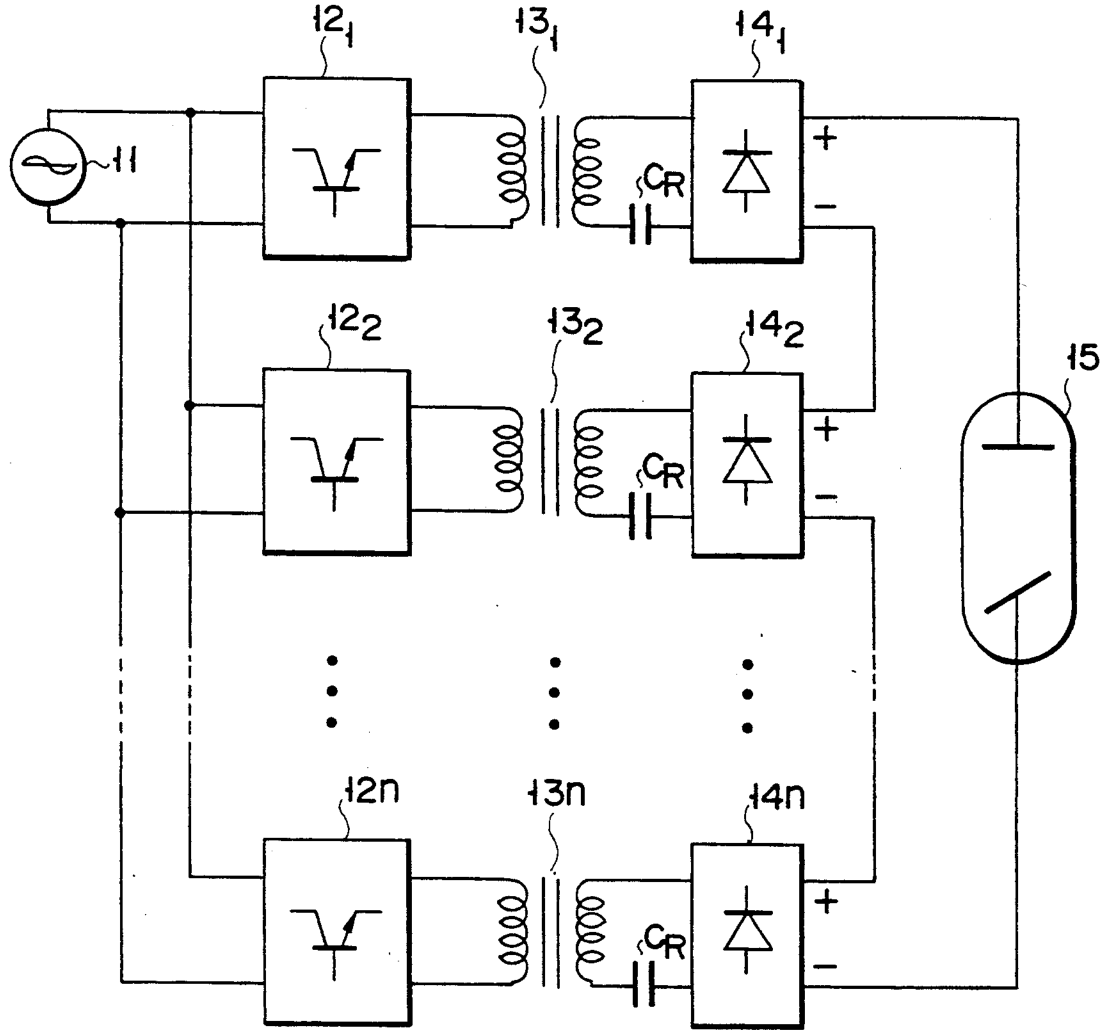
FIG. 11 is a block diagram of a second embodiment of an X-ray generator apparatus according to the present invention.

Next, a second embodiment is explained. FIG. 11 is a block diagram of the second embodiment. Portions which are the same as those of the first embodiment are denoted by the same reference numerals and the detail description thereof is omitted. In the first embodiment, only one frequency converter 12 is provided, but in the second embodiment, an frequency converter is also divided into n frequency converters like a transformer. Converters $12_1$, $12_2$, . . . $12_n$ which are connected in parallel with one another are connected to the A.C. power source 11. Outputs of the frequency converters $12_1$, $12_2$, . . . $12_n$ are supplied to rectifiers $14_1$, $14_2$, . . . $14_n$ via high voltage transformers $13_1$, $13_2$, . . . $13_n$. Capacitors $C_R$ are respectively connected in series with the secondary windings of the high voltage transformers $13_1$, $13_2$, . . . $13_n$ to constitute series resonant circuits on the secondary portion of the transformers.

Also, in this embodiment, the same effect as that of the first embodiment can be obtained. Further, in a case where a part of the frequency converters $12_1$, $12_2$, . . . $12_n$ is set into the rest or nonoperative state, outputs of those of the high voltage transformers $13_1$, $13_2$, . . . $13_n$ which are connected to the remaining frequency converters are bypassed the high voltage transformers which are connected to the frequency converters set in the rest state and applied to the X-ray tube 15. Therefore, the tube voltage can be roughly controlled by controlling the number of frequency converters which are set in the rest state. Moreover, if the frequency converters are PWM-controlled, the tube voltage can be precisely controlled.

Further, according to the second embodiment, since a number of frequency converters are used, even if a part of the frequency converters becomes defective, the defective frequency converters are set into the rest state and other frequency converters which are otherwise set in the rest or nonoperative state can be used instead of the defective frequency converters. Therefore, it becomes possible to prevent the whole X-ray generator apparatus from being set into the inoperative state. The maximum output is lowered by an amount corresponding to the number of defective frequency converters, but it is seldom to use the maximum output and the device can be used without receiving practical interference while the defective frequency converter is being replaced.

The resonance capacitor $C_R$ is connected to the secondary winding of each of the high voltage transformers $13_1$, $13_2$, . . . $13_n$ to cause an LC series resonance so as to prevent the voltage applied to the X-ray tube 15 from being lowered and to further increase the frequency of the frequency converters.

Figure 12:
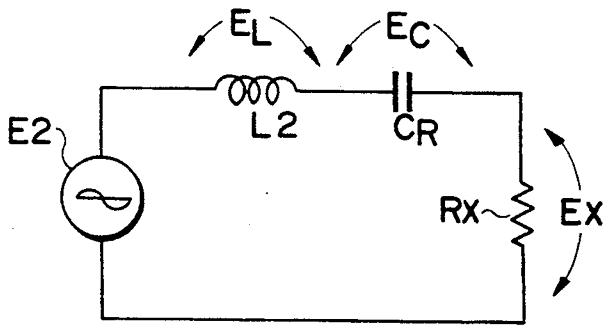
FIG. 12 is an equivalent circuit of a portion ranging from the secondary winding of each high voltage transformer to the X-ray tube in the second embodiment.

Next, the characteristic of the second embodiment is explained. An equivalent circuit of the secondary portion of one of the high voltage transformers 13 is shown in FIG. 12. Since the frequency converter 12 effects a switching operation for the rectangular wave, the secondary voltage E2 takes a rectangular waveform in the first embodiment shown in FIG. 6A, but takes substantially a sine waveform in the second embodiment in which the secondary portion is set in the resonant condition. Assuming that the frequency of the sine wave is f and $\omega=2\pi f$, and if the capacitance of the capacitor $C_R$ is so determined as to set up the condition of $\omega L2=1/\omega C_R$ at the frequency f according to the general theory of series resonance, then the impedance on the secondary portion becomes only Rx. Therefore, even if the frequency f is set at a high frequency, influence of the secondary inductance L2 to the tube voltage Ex can be neglected as shown in FIG. 12. However, voltages across L2 and $C_R$ in FIG. 12 have inverted phases and cancel each other but $E_L=E2\cdot\omega L2/Rx$ and $Ec=E2/(\omega C_R\cdot Rx)$ are obtained, and in general, they becomes relatively larger than E2. Therefore, in the conventional device shown in FIG. 6A, resonance cannot be attained on the secondary portion when the dielectric voltage of the transformer and capacitor and the insulating measure are taken into consideration.

However, in the present invention, since the high voltage transformer is divided into n portions, E2 and L2 in the respective resonant circuits can be reduced to E2/n and $L2/n^2$ as shown in FIG. 6B as in the first embodiment. In particular, L2 varies inversely with the square of the dividing number n, it becomes extremely small. In this way, since the voltages EL and EC across L2 and $C_R$ can be suppressed to small values, the advantage of the resonance on the secondary portion of the transformer can be effectively used.

As described above, in a case where only the high voltage transformer is divided as in the first embodiment, the secondary inductance L2 becomes smaller, making it possible to attain a high frequency operation. However, in a case where the resonance circuit is formed on the secondary portion of the transformer as in the second embodiment, influence by the secondary inductance L2 can be completely neglected, making it possible to attain a higher frequency operation. Alternatively, in a case where the device is operated at the same frequency as that obtained where no resonance circuit is formed on the secondary portion, the dividing number can be reduced within the permissible range of the breakdown voltage of the transformer and the capacitor. Since the primary voltage becomes a sine wave due to the resonance circuit in the secondary portion, it is possible to turn on or turn off switching transistors in the frequency converters at the time of the current does not flow therethrough. Therefore, the heat radiation of the apparatus can be suppressed, thereby increasing the efficiency of the apparatus. The secondary resonance is not limited to the series resonance described above but may be a parallel resonance attained by connecting a capacitor in parallel with the secondary winding of the high voltage transformer.

Figure 13:
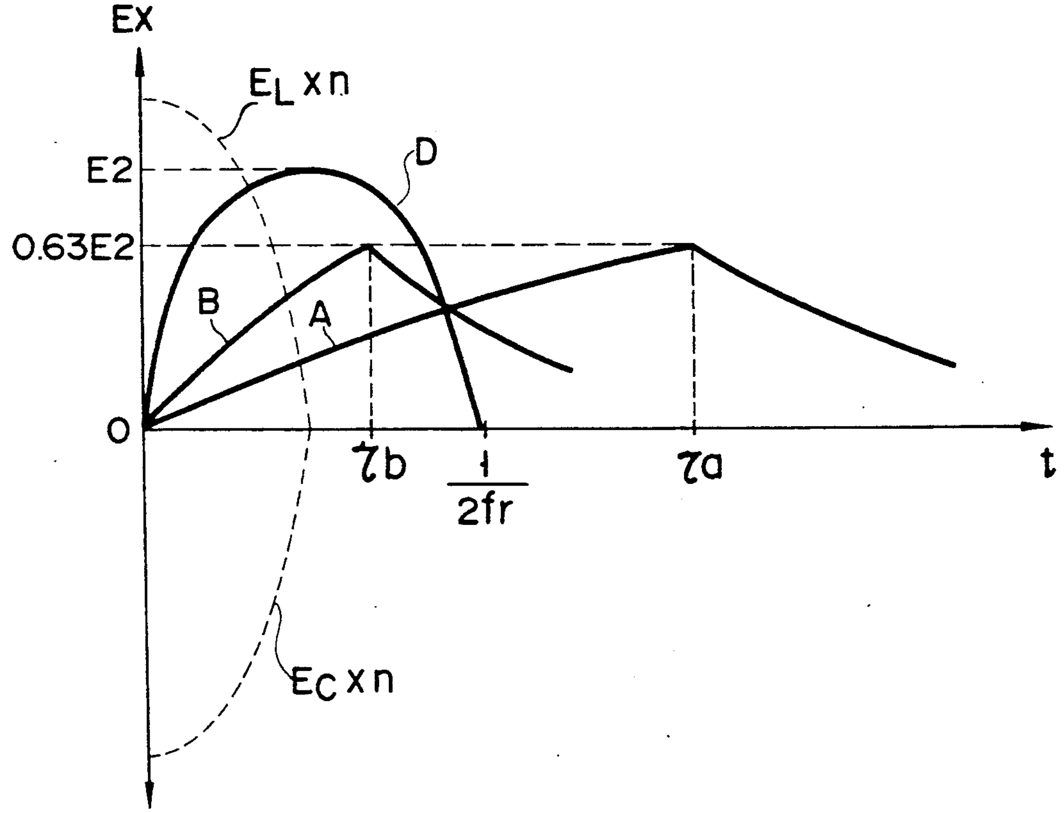
FIG. 13 is a diagram showing the characteristic of the second embodiment.

FIG. 13 shows the characteristic of the voltage applied to the X-ray tube 15 obtained when the secondary portion is set in the resonant mode. In FIG. 13, solid lines indicate Ex, and curves A and B among them respectively indicate the case of the conventional device and the case wherein the transformer is divided into n portions like the curves A and B of FIG. 7, and a curve D indicates a characteristic obtained when the high voltage transformer of the second embodiment is divided and the secondary portion is set in the resonant mode.

According to the second embodiment, the raising characteristic of the curves A and B which is suppressed by the secondary inductance of the transformer is improved by means of the resonance as indicated by the curve D. Therefore, a higher frequency operation can be attained, and the voltage applied to the X-ray tube can be further increased. FIG. 13, fr indicates the resonant frequency. Further, broken line curves indicate the voltages obtained by multiplying the terminal voltages $E_L$ and $E_C$ of the secondary inductance L2 and the capacitor $C_R$ with the dividing number n.

As described above, the operation frequency can be further enhanced and the dividing number can be reduced by use of the secondary resonance in comparison with a case wherein the high voltage transformer is simply divided.

Further, the modifications explained with reference to the first embodiment can also be applied in the second embodiment, and like the first embodiment, the transformers and rectifiers can be selectively molded into respective units with solid insulation material. It is not necessary to respectively connect the transformers to the frequency converters. It is possible to connect several transformers to a single frequency converter.

As described above, according to the X-ray generator apparatus of the present invention, the output frequency of the frequency converter can be increased by dividing the transformer for increasing an output A.C. voltage of the frequency converter which increases the frequency of an A.C. voltage into a plurality of transformers of small capacity in which the number of turns of the secondary winding is smaller than that of the original transformer, adding outputs of the transformers together, and applying the result of addition to the X-ray tube. As a result, the apparatus can be made small and lightweight, the control speed of the voltage can be enhanced if the frequency is increased, and the output voltage can be precisely controlled by feeding back the output. Further, the assembling and maintenance can be simplified by molding the divided transformers and the rectifiers into respective units with solid insulating material (including gel insulating material). In addition, ripple components included in the output voltage can be easily suppressed and stabilized by the high frequency operation and the X-rays can be easily generated in a pulse form. When the frequency is increased, the frequency of the switching pulse of the frequency so that noise can be prevented from being generated. Further, if a plurality of transformers are respectively connected to a plurality of frequency converters, each frequency converter can be easily and independently controlled so that the precision of generation of the X-rays can be enhanced, and even if one or some frequency converters become defective, the apparatus can be continuously operated by using the remaining frequency converters. The frequency can be further increased by connecting the capacitor to the secondary winding of the transformer to form an LC resonance circuit and effect the resonance operation Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An X-ray generator apparatus connected to an A.C. power source for applying a D.C. voltage to an X-ray tube, comprising:

a plurality of frequency converting means connected in parallel to said A.C. power source, for receiving an A.C. voltage from said A.C. power source and increasing the frequency of an input A.C. voltage;

a plurality of transformer means respectively connected to outputs of said plurality of frequency converting means, for respectively increasing output voltages of said frequency converting means;

a plurality of resonance circuits respectively connected to secondary windings of said plurality of transformer means; and rectifier means including a plurality of rectifiers respectively connected to output terminals of said plurality of transformer means for rectifying outputs of said plurality of transformer means and applying a D.C. voltage corresponding to the sum of the outputs of said transformer means to said X-ray tube.

2. An apparatus according to claim 1, in which said secondary windings of said plurality of transformer means and said rectifier means are molded with solid or gel insulating material.

3. An apparatus according to claim 1, in which combinations of said secondary windings of said plurality of transformer means and said plurality of rectifiers are molded one or a preset number at a time with solid or gel insulating material.

4. An apparatus according to claim 1, in which each of said plurality of resonance circuits comprises a capacitor connected in series to said secondary winding of said transformer means.

* * * * *